UNITED STATES PATENT OFFICE.

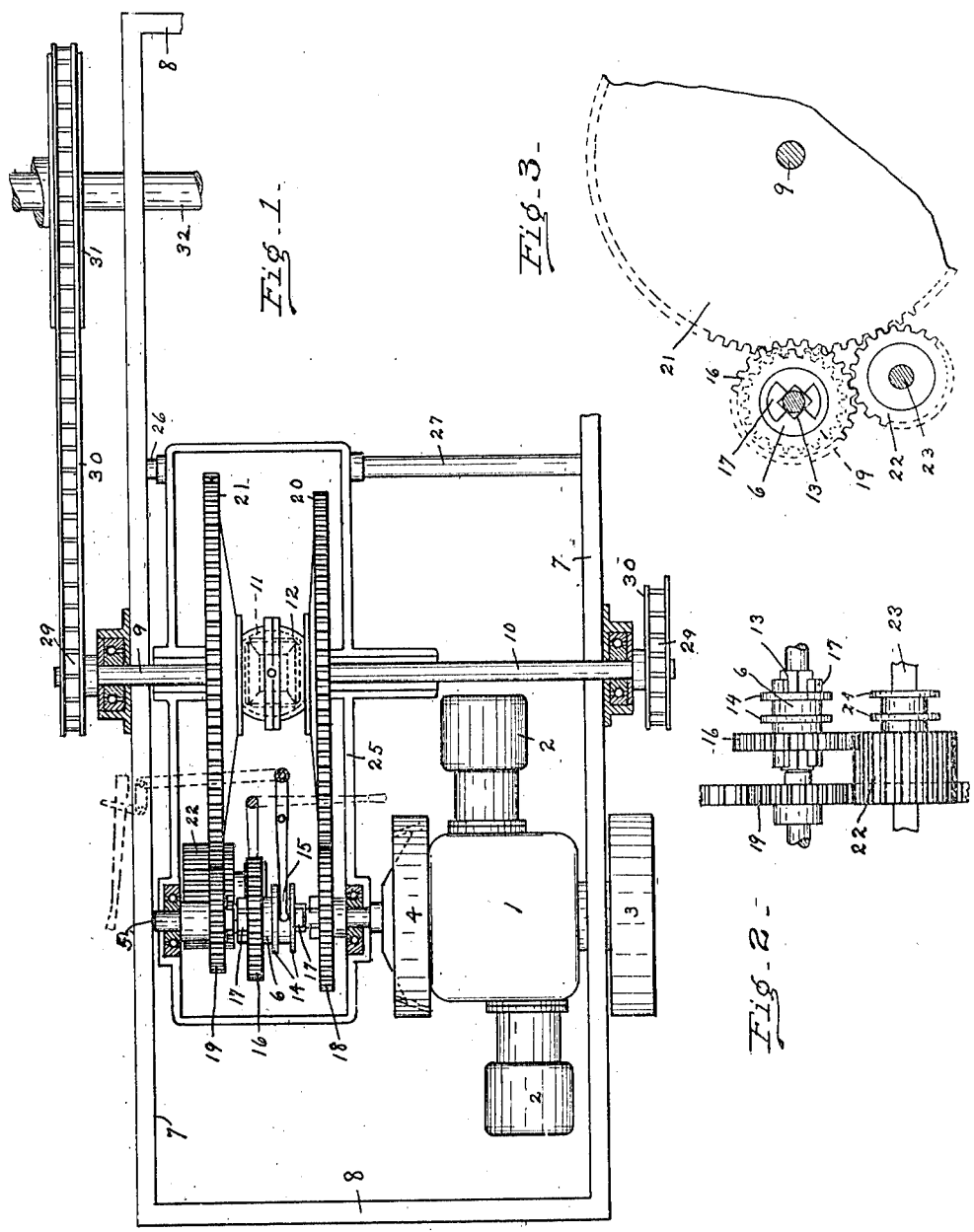

JOHN DEMMLER, OF GROVE CITY, PENNSYLVANIA.

TRANSMISSION-GEARING.

1,040,649.     Specification of Letters Patent.     Patented Oct. 8, 1912.

Application filed May 15, 1912. Serial No. 697,332.

*To all whom it may concern:*

Be it known that I, JOHN DEMMLER, a subject of the Emperor of Germany, residing at Grove City, in the county of Mercer and State of Pennsylvania, have invented a new and Improved Transmission-Gearing, of which the following is a specification.

This invention relates to means for driving vehicles, and its object is to provide a power-transmitting device between the engine shaft and the main-intermediate or jack-shaft which shall be simple, compact and efficient.

In the accompanying drawing, Figure 1 is a plan of the driving mechanism. Figs. 2 and 3 are details of reversing gears.

Similar reference characters refer to like parts throughout the several views.

The construction shown in the drawings is especially adapted for tractors, but may be employed to drive any other type of vehicle. Any desired type of engine may be employed, that shown being a well-known form consisting of a body or case 1, cylinders 2, fly-wheel 3, and clutch 4 which connects to the main shaft 5. This portion of the mechanism is merely shown to illustrate the general application of my invention. The chassis is merely indicated as formed of side-bars 7 and end bars 8.

The jack shaft or main-intermediate shaft of the transmission mechanism is formed of two parts 9 and 10 in the usual manner, which parts are connected by any desired form of differential gearing 11, indicated in dotted lines within the well known casing 12.

On the main shaft is slidably mounted a sleeve 6 which is caused to revolve with this shaft in any desired manner. I prefer to square the shaft intermediate its ends, as at 13 in Figs. 2 and 3. The sleeve has collars 14 between which a fork 15 extends. This fork may be operated in any desired manner to shift the sleeve either way along the shaft. On the sleeve is formed a spur-pinion 16, and the ends of the sleeve are provided with jaws 17 which may engage with the supplementary jaws on the transmission members 18 and 19 which are freely revoluble on the shaft. These transmission members 18 and 19 as well as the members 20 and 21 that are connected to the casing 12, may be of any desired type, spur gears preferred. The pinion 19 is smaller than the pinion 18, their proportions depending upon the difference in the speeds at which the vehicle is to be driven. Sliding the sleeve 6 so its jaws 17 engage with the jaws formed on the gear 19 will cause the engine to drive the differential casing 12 at one speed, and at a different and greater speed when the jaws on the sleeve engage those on the gear 19. When the sleeve is central, as shown in Fig. 1, the shaft 9—10 will normally be stationary.

In order to drive the shaft 9—10 in the reverse direction, means shown in Figs. 2 and 3 are employed to transmit movement from the gear 16 to the pinion 21. A long gear 22 is mounted on the shaft 23 and is in mesh with the gear 21, and is slidably mounted so it can be moved into mesh with the gear 16. Collars 24 may be formed on the hub of this gear 22 so that it may be moved by any proper mechanism. The shaft 23 is carried by the auxiliary frame 25 which is mounted on the jack-shaft 9—10 and on the supports 26 and 27. This frame 25 supports the bearings for the shaft 5.

From the jack-shaft, power may be transmitted in any desired manner. In the drawing, sprocket wheels 29 and chains 30 are shown, which chains run on the large wheel-driving chain-gears 31 on the rear axle 32.

By this construction, the usual bevel gears now employed between the engine and jack shaft are eliminated, as well as the countershaft and bearings therefor. The friction of these parts is therefore done away with, and the efficiency of the motor is increased.

The construction is very compact and of few parts, the distance between the main shaft 5 and the jack-shaft being reduced to a minimum and, as the majority of starting operations are forward, the great wear on gear teeth now occurring in many of the present "sliding transmissions" is avoided.

The proportions and sizes of the parts may be varied according to circumstances by those skilled in the art.

Having now explained my construction, what I claim as my invention and desire to secure by Letters Patent is:—

1. In a transmission gearing, the combination of a main shaft, means to drive the same, a sleeve slidable thereon and revoluble therewith, said sleeve formed with clutch member at each end and a spur gear, a pinion loosely mounted on said shaft at each end of the sleeve, driven gears meshing with said pinions, a small gear in mesh with one of the driven gears, and means to cause the small gear to move into and out of mesh with the gear on the sleeve.

2. In a transmission gearing, the combination of a shaft, means to drive the same, a sleeve slidable thereon and revoluble therewith and provided with a clutch member at one end, a pinion revoluble on said shaft and having a clutch member adapted to be engaged by the clutch on the sleeve, a driven gear meshing with said pinion, a pinion formed on said sleeve, a small gear meshing with the driven gear and means to move the same into engagement with the pinion on the sleeve.

3. In a transmission gearing, the combination of a main shaft and means to drive the same, a sleeve slidable thereon and revoluble therewith, said sleeve formed with a clutch member at each end and a spur gear, pinions of different sizes loosely mounted on said shaft, one at each end of the sleeve, and provided with clutch members adapted to be engaged by the clutch member on the adjacent end of the sleeve, driven gears meshing with said pinions, a small gear mounted adjacent one of said driven gears, and means to cause said small gear to connect said driven gear and the gear on said sleeve, and means to slide the sleeve longitudinally to cause it to drive either pinion at will.

In testimony whereof I have signed this specification in the presence of two subscribing witnesses.

JOHN DEMMLER.

Witnesses:
JOHN McCUNE, Jr.,
EDWIN F. ATWELL.